(12) United States Patent
Funk et al.

(10) Patent No.: US 7,636,608 B2
(45) Date of Patent: Dec. 22, 2009

(54) METHOD FOR DYNAMIC SENSOR CONFIGURATION AND RUNTIME EXECUTION

(75) Inventors: Merritt Funk, Austin, TX (US); Masaki Tozawa, Tokyo (JP)

(73) Assignee: Tokyo Electron Limited, Tokyo (JP)

( * ) Notice: Subject to any disclaimer, the term of this patent is extended or adjusted under 35 U.S.C. 154(b) by 608 days.

(21) Appl. No.: 11/025,227

(22) Filed: Dec. 30, 2004

(65) Prior Publication Data
US 2005/0177269 A1 Aug. 11, 2005

Related U.S. Application Data

(63) Continuation of application No. PCT/US03/19042, filed on Jun. 18, 2003.

(60) Provisional application No. 60/393,091, filed on Jul. 3, 2002.

(51) Int. Cl.
*G06F 19/00* (2006.01)
*G06F 11/00* (2006.01)
*G01R 31/26* (2006.01)

(52) U.S. Cl. .................. 700/108; 438/14; 700/109; 700/121; 714/25

(58) Field of Classification Search .............. 700/108, 700/109, 121; 438/14; 714/25
See application file for complete search history.

(56) References Cited

U.S. PATENT DOCUMENTS

| | | | |
|---|---|---|---|
| 4,571,685 A * | 2/1986 | Kamoshida | ............... 700/108 |
| 5,168,441 A | 12/1992 | Onarheim et al. | |
| 5,980,078 A | 11/1999 | Krivoshein et al. | |
| 6,115,643 A * | 9/2000 | Stine et al. | ................ 700/110 |
| 6,263,255 B1 * | 7/2001 | Tan et al. | .................... 700/121 |
| 6,801,826 B2 * | 10/2004 | Tanabe | ....................... 700/121 |
| 6,952,688 B1 * | 10/2005 | Goldman et al. | ............. 706/45 |
| 7,113,838 B2 * | 9/2006 | Funk et al. | .................. 700/108 |
| 2005/0047645 A1 | 3/2005 | Funk et al. | |
| 2005/0065630 A1 | 3/2005 | Funk et al. | |
| 2005/0159911 A1 | 7/2005 | Funk et al. | |

FOREIGN PATENT DOCUMENTS

WO WO 01/57823 A2 8/2001

OTHER PUBLICATIONS

"Human Interface Standard for Semiconductor Manufacturing Equipment," SEMI Draft Doc. #2783B, SEMI (Semiconductor Equipment and Materials International) (San Jose, CA), 15 pp., (1999).
"Specification for Human Interface for Semiconductor Manufacturing Equipment," SEMI E95-1101, SEMI (Semiconductor Equipment and Materials International (San Jose, CA), 15 pp, (2000-2001).
"Strategic Cell Controller (SCC) User-Interface Style Guide 1.0," Technology Transfer 92061179A-ENG, SEMATECH, Inc. (Austin, TX), 204 pp, ( Aug. 21, 1992), p. 1-216.

* cited by examiner

*Primary Examiner*—Albert DeCady
*Assistant Examiner*—Thomas H Stevens

(57) ABSTRACT

Graphical User Interfaces (GUIs) are presented for configuring and setting-up dynamic sensors for monitoring tool and process performance in a semiconductor processing system. The semiconductor processing system includes a number of processing tools, a number of processing modules (chambers), and a number of sensors. The graphical display is organized so that all significant parameters are clearly and logically displayed so that the user is able to perform the desired configuration and setup tasks with as little input as possible. The GUI is web-based and is viewable by a user using a web browser.

24 Claims, 12 Drawing Sheets

| Plan | Sensor Setting | Sensor Setup Item | Parameter Saving | Formula Info | Param Collection Info |

Setup Items for ENI_VI_Probe: 10408

| Item Name | Item Value | Description |
|---|---|---|
| MFkhz | 13560 271204... | The selected frequencies are only used when the Mo |
| MFSampleTime | 1000 | When operating in Multiple frequency mode, the sam... |
| Mode | Multiple | The V/I probe can measure at one RF Frequency or a... |
| SFKhz | 13560 | When the operating Mode is Single, the frequency, in... |
| SFSampleTime | 1000 | The usual value of 100 milliseconds corresponds to ... |

Edit

Close

FIG. 7

| Plan | Sensor Setting | Sensor Setup Item | Parameter Saving | Formula Info | Param Collection Info |

Parameters for ENI_VI_Probe.10408 In the TeliusPC and module1

| Save | Param Name | New Param Name | Formula |
|---|---|---|---|
| [X] | | VIP_I_1356 | |
| [X] | | VIP_I_2712 | |
| [X] | | VIP_I_4068 | |
| [X] | | VIP_I_5424 | |
| [X] | | VIP_PHASE_1356 | |
| [X] | | VIP_PHASE_2712 | |
| [X] | | VIP_PHASE_4068 | |
| [X] | | VIP_PHASE_5424 | |
| [X] | | VIP_STATUS_1356 | |
| [X] | | VIP_STATUS_2712 | |
| [X] | | VIP_STATUS_4068 | |
| [X] | | VIP_STATUS_5424 | |

Buttons: New, Edit, Select Highlighted, Deselect Highlig..., Summary Info, Delete Created Save | Undo Close

FIG. 10

METHOD FOR DYNAMIC SENSOR CONFIGURATION AND RUNTIME EXECUTION

CROSS-REFERENCE TO RELATED APPLICATIONS

This is a Continuation of International Patent Application No. PCT/US03/19042, filed Jun. 18, 2003, which relies for priority on and claims the benefit of U.S. Provisional Application No. 60/393,091, entitled, "Method For Dynamic Sensor Configuration and Runtime Execution", filed Jul. 3, 2002, the contents of both of which are incorporated herein by reference in their entireties.

The present application is related to co-pending applications U.S. Provisional Application No. 60/368,162, entitled "Method For Interaction With Status and Control Apparatus", filed on Mar. 29, 2002; U.S. Provisional Application No. 60/374,486, entitled "Method and Apparatus for Simplified System Configuration", filed on Apr. 23, 2002; U.S. Provisional Application No. 60/383,619, entitled "Method and Apparatus For Monitoring Tool Performance", filed on May 29, 2000; and U.S. Provisional Application No. 60/393,104, entitled "Method and Apparatus for Automatic Sensor Installation," filed on Jul. 3, 2002. Each of these applications is herein incorporated by reference in its entirety.

FIELD OF THE INVENTION

The present invention is related to semiconductor processing systems, particularly to semiconductor processing systems, which use Graphical User Interfaces (GUIs) to configure and use dynamic sensors.

BACKGROUND OF THE INVENTION

Computers are generally used to control, monitor, and initialize manufacturing processes. A computer is ideal for these operations given the complexities in a semiconductor manufacturing plant from the reentrant wafer flows, critical processing steps, and maintainability of the processes. Various input/output (I/O) devices are used to control and monitor process flows, wafer states, and maintenance schedules. A variety of tools exist in a semiconductor manufacturing plant to complete these complicated steps from critical operations such as etching, to batch processing, and inspections. Most tool installations are accomplished using a display screen that is part of the graphical user interface (GUI) of a control computer containing the installation software. Installation of a semiconductor processing tool is a time consuming procedure.

Semiconductor processing facilities require constant monitoring. Processing conditions change over time with the slightest changes in critical process parameters creating undesirable results. Small changes can easily occur in the composition or pressure of an etch gas, process chamber, or wafer temperature. In many cases, changes of process data reflecting deterioration of processing characteristics cannot be detected by simply referring to the process data displayed. It is difficult to detect early stage abnormalities and characteristic deterioration of a process. Oftentimes prediction and pattern recognition offered by advanced process control (APC) is necessary.

Facility control is often performed by a number of different control systems having a variety of controllers. Some of the control systems may have man-machine interfaces such as touch screens, while others may only collect and display one variable such as temperature. The monitoring system may collect data tabulated for the process control system. The data collection of the monitoring system can involve univariate and multivariate data, the analysis and display of the data, and can have the ability to select the process variables to collect. Various conditions in a process are monitored by different sensors provided in each of the process chambers, and data of the monitored conditions is transferred and accumulated in a control computer. If the process data is displayed and detected automatically, the process conditions of a mass-production line can be set and controlled through statistical process control (SPC) charts. Inefficient monitoring of a facility can result in facility downtimes that add to the overall operational cost.

SUMMARY OF THE INVENTION

Accordingly, the present invention provides a method for setting-up a dynamic sensor in a semiconductor processing environment using Graphical User Interfaces (GUIs). In the method, a data collection plan is executed. The data collection plan is used to determine a dynamic sensor setup plan. The dynamic sensor setup plan is executed to set up the dynamic sensor.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention. A more complete appreciation of the invention will be obtained with reference to the following detailed description, particularly when considered in conjunction with the accompanying drawings, in which:

FIG. 7 shows an exemplary view of a Sensor Setting screen in accordance with one embodiment of the present invention;

FIG. 10 shows an exemplary view of Parameter Saving screen in accordance with one embodiment of the present invention;

A DETAILED DESCRIPTION OF AN EMBODIMENT

Figure 1:
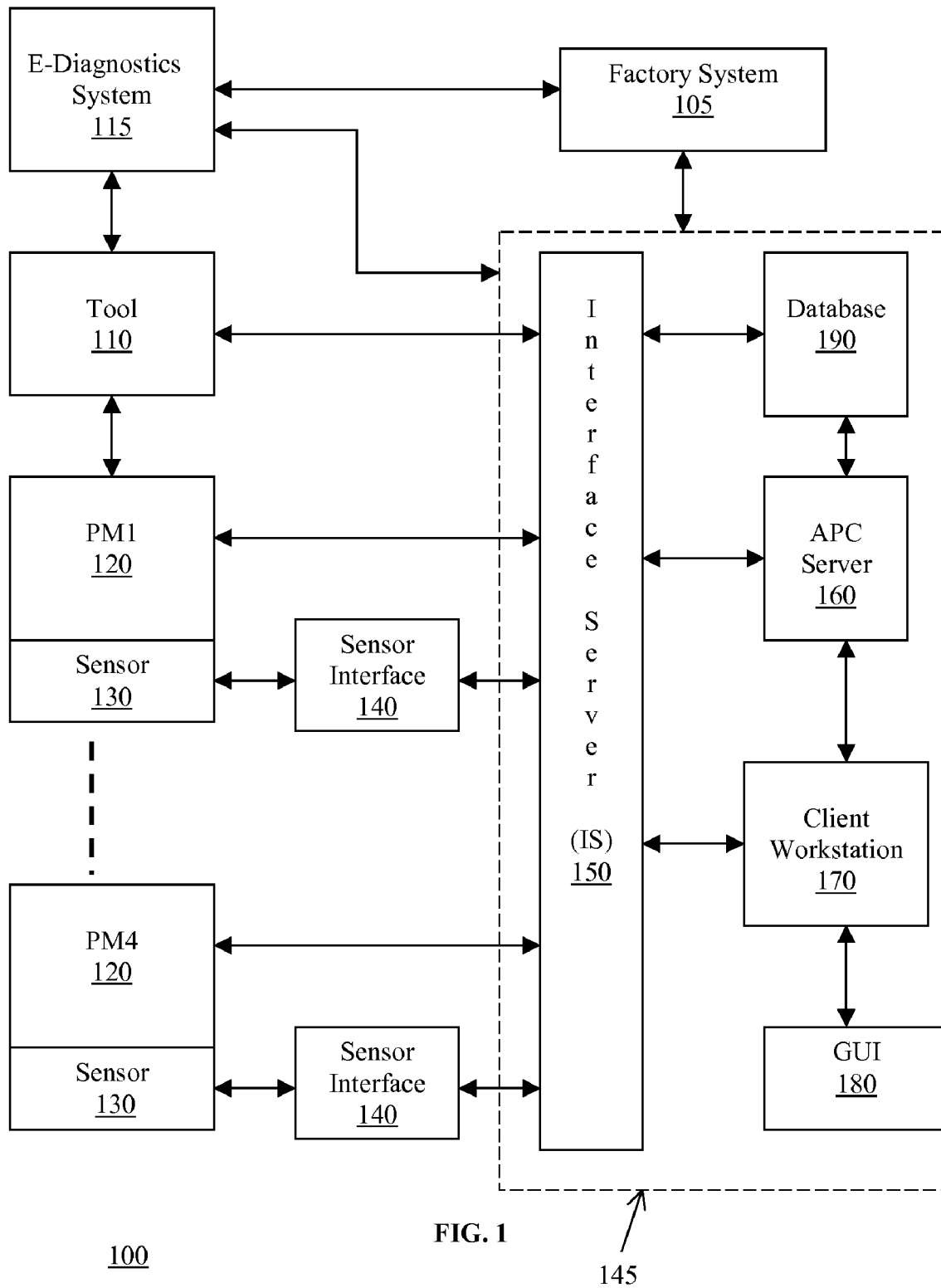
FIG. 1 shows a simplified block diagram of an advanced process controlled (APC) semiconductor manufacturing system in accordance with one embodiment of the present invention.

FIG. 1 shows an exemplary block diagram of an APC system in a semiconductor manufacturing environment in accordance with one embodiment of the present invention. In the illustrated embodiment, semiconductor manufacturing environment 100 comprises at least one semiconductor processing tool 110, multiple process modules 120, PM1 through PM4, multiple sensors 130 for monitoring the tool, the modules, and processes, sensor interface 140, and APC system 145. APC system 145 can comprise interface server (IS) 150, APC server 160, client workstation 170, GUI component 180, and database 190. In one embodiment, IS 150 can comprise a real-time memory database that can be viewed as a "Hub".

APC system 145 can comprise a tool status monitoring system for monitoring the performance of at least one of a processing tool, a process module, and a sensor.

In the illustrated embodiment, a single tool 110 is shown along with four process modules 120, but this is not required for the invention. The tool status monitoring system can interface with a number of processing tools including cluster tools having one or more process modules. The tool status monitoring system can be used to configure and monitor a number of processing tools including cluster tools having one or more process modules. For example, the tools and their associated process modules can be used to perform etching, deposition, diffusion, cleaning, measurement, polishing, developing, transfer, storage, loading, unloading, aligning, temperature control, lithography, integrated metrology (IM), optical data profiling (ODP), particle detection, and other semiconductor manufacturing processes.

In one embodiment, processing tool 110 can comprise a tool agent (not shown), which can be a software process that runs on a tool 110 and which can provide event information, context information, and start-stop timing commands used to synchronize data acquisition with the tool process. Also, APC system 145 can comprise an agent client (not shown) that can be a software process that can be used to provide a connection to the tool agent. For example, APC system 145 can be connected to processing tool 110 via an internet or intranet connection.

In one embodiment, IS 150 communicates using sockets. For example, the interface can be implemented using TCP/IP socket communication. Before every communication, a socket is established. Then a message is sent as a string. After the message is sent, the socket is cancelled.

Alternately, an interface can be structured as a TCL process extended with C/C++ code, or a C/C++ process that uses a special class, such as a Distributed Message Hub (DMH) client class. In this case, the logic, which collects the process/tool events through the socket connection can be revised to insert the events and their context data into a table in IS 150.

The tool agent can send messages to provide event and context information to the tool status monitoring system. For example, the tool agent can sent lot start/stop messages, batch start/stop messages, wafer start/stop messages, recipe start/stop messages, and process start/stop messages. In addition, the tool agent can be used to send and/or receive set point data and to send and/or receive maintenance counter data.

When a processing tool comprises internal sensors, this data can be sent to the tool status monitoring system. Data files can be used to transfer this data. For example, some processing tools can create trace files that are compressed in the tool when they are created. Compressed and/or uncompressed files can be transferred. When trace files are created in the processing tool, the trace data may or may not include end point detection (EPD) data. The trace data provides important information about the process. The trace data can be updated and transferred after the processing of a wafer is completed. Trace files are be transferred to the proper directory for each process. In one embodiment, tool trace data, maintenance data, and EPD data can be obtained from a processing tool 110.

In FIG. 1, four process modules are shown, but this is not required for the invention. The semiconductor processing system can comprise any number of processing tools having any number of process modules associated with them and independent process modules. The APC system 145 including the tool status monitoring system can be used to configure and monitor any number of processing tools having any number of process modules associated with them and independent process modules. The tool status monitoring system can collect, provide, process, store, and display data from processes involving processing tools, process modules, and sensors.

Process modules can be identified using data such as ID, module type, gas parameters, and maintenance counters, and this data can be saved into a database. When a new process module is configured, this type of data can be provided using a module configuration panel/screen in GUI component 180. For example, the APC system can support the following tool types from Tokyo Electron Limited: Unity-related process modules, Trias-related process modules, Telius-related process modules, OES-related modules, and ODP-related modules. Alternately, the APC system can support other tools and their related process modules. For example, APC system 145 can be connected to process modules 120 via an internet or intranet connection.

In the illustrated embodiment, a single sensor 130 is shown along with an associated process module, but this is not required for the invention. Any number of sensors can be coupled to a process module. Sensor 130 can comprise an ODP sensor, an OES sensor, a VIP sensor, an analog sensor, and other types of semiconductor processing sensors including digital probes. The APC data management applications can be used to collect, process, store, display, and output data from a variety of sensors.

In the APC system, sensor data can be provided by both external and internal sources. External sources can be defined using an external data recorder type; a data recorder object can be assigned to each external source; and a state variable representation can be used.

Sensor configuration information combines sensor type and sensor instance parameters. A sensor type is a generic term that corresponds to the function of the sensor. A sensor instance pairs the sensor type to a specific sensor on a specific process module and tool. At least one sensor instance is configured for each physical sensor that is attached to a tool.

For example, an OES sensor can be one type of sensor; a VI probe can be another type of sensor, and an analog sensor can be a different type of sensor. In addition, there can be additional generic types of sensors and additional specific types of sensors. A sensor type includes all of the variables that are needed to set up a particular kind of sensor at run time. These variables can be static (all sensors of this type have the same value), configurable by instance (each instance of the sensor type can have a unique value), or dynamically configurable by a data collection plan (each time the sensor is activated at run time, it can be given a different value).

A "configurable by instance" variable can be the sensor/probe IP address. This address varies by instance (for each process chamber) but does not vary from run to run. A "configurable by data collection plan" variable can be a list of harmonic frequencies. These can be configured differently for each wafer based on the context information. For example, wafer context information can include tool ID, module ID, slot ID, recipe ID, cassette ID, start time and end time. There can be many instances of the same sensor type. A sensor instance corresponds to a specific piece of hardware and connects a sensor type to the tool and/or process module (chamber). In other words, a sensor type is generic and a sensor instance is specific.

As shown is FIG. 1, sensor interface 140 can be used to provide an interface between sensor 130 and the APC system 145. For example, APC system 145 can be connected to sensor interface 140 via an internet or intranet connection, and sensor interface 140 can be connected to sensor 130 via an internet or intranet connection. Also, sensor interface 140 can act as a protocol converter, media converter, and data buffer. In addition, sensor interface 140 can provide real-time functions, such as data acquisition, peer-to-peer communications, and I/O scanning. Alternately, sensor interface 140 can be eliminated, and the sensor 130 can be directly coupled to APC system 145.

Sensor 130 can be a static or dynamic sensor. For example, a dynamic VI sensor can have its frequency range, sampling period, scaling, triggering, and offset information established at run-time using parameters provided by a data collection plan. Sensor 130 can be an analog sensor that can be static and/or dynamic. For example, analog sensors can be used to provide data for ESC voltage, matcher parameters, gas parameters, flow rates, pressures, temperatures, RF parameters, and other process related data. Sensor 130 can comprise at least one of a: VIP probe, OES sensor, analog sensor, digital sensor, and a semiconductor processing sensor.

In one embodiment, a sensor interface can write the data points to a raw data file. For example, IS 150 can send a start command to the sensor interface to initiate data acquisition and can send a stop command to cause the file to be closed. IS 150 can then read and parse the sensor data file, process the data and post the data values into the in-memory data tables.

Alternately, the sensor interface could stream the data in real time to the IS 150. A switch could be provided to allow the sensor interface to write the file to disk. The sensor interface can also provide a method to read the file and stream the data points to the IS 150 for off-line processing and analysis.

As shown in FIG. 1, APC system 145 can comprise a database 190. Tool status monitoring data can be stored in database 190. In addition, raw data and trace data from the tool can be stored as files in the database 190. The amount of data depends on the data collection plans configured by the user, as well as the frequency with which processes are performed and processing tools are run. For example, data collection plans can be established for determining how and when to collect tool status data. The data obtained from the processing tools, the processing chambers, the sensors, and the APC system is stored in tables.

In one embodiment, the tables can be implemented in the IS 150 as in-memory tables and in database 190 as persistent storage. The IS 150 can use Structured Query Language (SQL) for column and row creation as well as posting data to the tables. The tables can be duplicated in the persistent tables in database 190 (i.e., DB2 can be used) and can be populated using the same SQL statements.

In the illustrated embodiment, IS 150 can be both an in-memory real-time database and a subscription server. For example, client processes are able to perform database functions using SQL with the familiar programming model of relational data tables. In addition, the IS 150 can provide a data subscription service where the client software receives asynchronous notification whenever data that meets their selection criteria is inserted, updated, or deleted. A subscription uses the full power of an SQL select statement to specify which table columns are of interest and what row selection criteria is used to filter future data change notifications.

Because the IS 150 is both a database and a subscription server, clients can open "synchronized" subscriptions to existing table data when they are initialized. The IS 150 provides data synchronization through a publish/subscribe mechanism, in-memory data tables, and supervisory logic for marshalling events and alarms through the system. The IS 150 provides several messaging TCP/IP based technologies including sockets, UDP, and publish/subscribe.

For example, the IS 150 architecture can use multiple data hubs (i.e., SQL databases) that can provide real-time data management and subscription functions. Application modules and user interfaces use SQL messages to access and update information in the data hub(s). Due to performance limitations associated with posting run time data to the relational database, run time data is posted to in-memory data tables managed by the IS 150. The contents of these tables can be posted to the relational database at the end of wafer processing.

In the illustrated embodiment shown in FIG. 1, a single client workstation 170 is shown but this is not required for the invention. The APC system 145 can support a plurality of client workstations 170. In one embodiment, the client workstation 170 allows a user to perform configuration procedures; to view status including tool, chamber, and sensor status; to view process status; to view historical data; and to perform modeling and charting functions.

In the illustrated embodiment shown in FIG. 1, APC system 145 can comprise an APC server 160 that can coupled to IS 150, client workstation 170, GUI component 180, and database 190, but this is not required for the invention. The APC server 160 can comprise a number of applications including at least one tool-related application, at least one module-related application, at least one sensor-related application, at least one IS-related application, at least one database-related application, and at least one GUI-related application. In addition, APC server can comprise a number of tool status monitoring system applications.

The APC server 160 comprises at least one computer and software that supports multiple process tools; collects and synchronizes data from tools, process modules, sensors, and probes; stores data in a database, enables the user to view existing charts; and provides fault detection. For example, APC server 160 can comprise operational software, such as the Ingenio software, from Tokyo Electron. The APC server allows online system configuration, online lot-to-lot fault detection, online wafer-to-wafer fault detection, online database management, and performs multivariate analysis of summary data using models based upon historical data. In addition, the tool status monitoring system allows real-time monitoring of the processing tools.

For example, APC server 160 can comprise a minimum of 3 GB available disk space; at least 600 MHz CPU (Dual processors); a minimum 512 Mb RAM (physical memory); a 9 GB SCSI hard drives in a RAID 5 configuration; a minimum disk cache that is twice the RAM size; Windows 2000 server software installed; Microsoft Internet Explorer; TCP/IP Network protocol; and at least two network cards.

APC system 145 can comprise at least one storage device that stores files containing raw data from sensors and files containing trace data from the tool. If these files are not managed properly (i.e., deleted regularly), the storage device can run out of disk space, and can stop collecting new data. The APC system 145 can comprise a data management application that allow the user to delete older files, thereby freeing disk space so that data collection can continue without interruption. The APC system 145 can comprise a plurality of tables that are used to operate the system, and these tables can be stored in database 190. In addition, other computers (not shown), such as on-site or off-site computers/workstations and/or hosts, can be networked to provide functions such as data/chart viewing, SPC charting, EPD analysis, file access, for one or many tools.

As shown in FIG. 1, the APC system 145 can comprise a GUI component 180. For example, a GUI component can run as an application on the APC server 160, client workstation 170, and tool 110.

GUI component 180 enables an APC system user to perform the desired configuration, data collection, monitoring, modeling, and troubleshooting tasks with as little input as possible. The GUI design complies with the SEMI Human Interface Standard for Semiconductor Manufacturing Equipment (SEMI Draft Doc. #2783B) and With the SEMATECH Strategic Cell Controller (SCC) User-Interface Style Guide 1.0 (Technology Transfer 92061179A-ENG). Those skilled in the art will recognize that GUI panels/screens can comprise a left-to-right selection tab structure and/or a right-to-left structure, a bottom-to-top structure, a top-to-bottom structure, or a combination structure.

In addition, although the screens shown for illustration were English language versions this is not required for the invention and different languages can be used. For example, a Japanese language screen, a Chinese language screen, a Taiwanese language screen, a Korean language screen, a German language screen, and a French language screen can be used.

Also, GUI component 180 provides a means of interaction between the tool status monitoring system and the user. When the GUI begins, a logon screen that validates the user identification and password can be displayed and that provides a first level of security. Users can be registered using a security application before logging on. A database check of user identification indicates an authorization level, which will streamline the GUI functions available. Selection items for which the user is not authorized can be differently and unavailable. The security system also allows a user to change an existing password. For example, the logon panel/screen can be opened from a browser tool such as Netscape or Internet Explorer. A user can enter a user ID and password in the logon fields.

Authorized users and administrators can use GUI panels/screens to modify system configuration and sensor setup parameters. The GUI component 180 can comprise a configuration component for allowing a user to configure processing tools, processing modules, sensors, and the APC system. For example, GUI configuration panels/screens can be provided for at least one of a processing tool, a processing module, a sensor, a sensor instance, a module pause, and an alarm. Configuration data can be stored in an attribute database table and can be setup with the defaults at the installation.

The GUI component 180 can comprise a status component for displaying the current status for processing tools, processing modules, sensors, and the APC system. In addition, the status component can comprise a charting component for presenting system-related and process-related data to a user using one or more different types of charts.

Also, GUI component 180 can comprise a real-time operational component. For example, a GUI component can be coupled to a background task, and shared system logic can provide the common functionality used both by the background task and by the GUI component. Shared logic can be used to guarantee that the returned values to the GUI component are the same as the ones returned to the background task. Furthermore, the GUI component 180 can comprise an APC file management GUI component and a security component. Help panels/screens are also available. For example, help files are provided in PDF (Portable Document Format) and/or HTML format.

As shown in FIG. 1, an APC system 145 including a tool status monitoring system can be coupled to a factory system 105 and/or an E-Diagnostics system 115. Factory system 105 and/or E-Diagnostics system 115 can provide means for externally monitoring and for externally controlling the tools, modules, sensors, and processes in a semiconductor processing system. Alternately, the factory system 105 and/or an E-Diagnostics system 115 can perform tool status monitoring. For example, a user can access the tool status monitoring system using a web based terminal that is coupled to the semiconductor processing system via factory system 105 and/or an E-Diagnostics system 115.

In addition, the APC system and the E-Diagnostic system can work together to solve problems in real time. For example, when the APC system 145 detects a fault, the information needed to diagnose the problem can be bundled by the APC server and transmitted to the E-Diagnostic system or stored for access by the E-Diagnostic system at a later time. The operating method can be determined using security constrains and/or customer business rules.

Also, the APC comprises means for adding sensors, editing data collection plans that are context and/or event driven. For example, this can allow E-Diagnostics "probes" and/or software components to be downloaded for the E-Diagnostic system to trouble shoot the system. The E-Diagnostic system can comprise a portable set of diagnostic tools that can provide additional data, which can be used to diagnose, detect, and/or predict a problem. For example, the APC system can use these diagnostic tools as additional sensors. With a general sensor interface that support multiple protocols, including analog input as the lowest level, a local portable diagnostic unit can be coupled to the factory system and then used remotely by the APC system, the E-Diagnostic system and/or the factory system.

The APC system can be provided with a new application that was remotely developed at the factory and downloaded from the factory or the E-Diagnostic system. For example, the new application can reside locally in the APC server. The APC system has the ability to learn new procedures and dynamically add sensors, add applications, and even add GUI screens for a custom sensor. Furthermore, the APC system can perform very specific procedures such as a timing analysis allocation to figure out when a tool and/or module malfunctions (i.e. a wafer handling system problem with a motor or actuator arm position).

In addition, the APC system can change the sampling rate based on the tool performance. For example, the data collection sampling rates and amount of analysis can be changed based on tool health. The APC system can also predict a problem or detect that a tool and/or module is running near a limit condition.

In addition, advanced users and administrators can use GUI screens to modify system configuration and sensor setup parameters; create and edit tool-related strategies and plans; and/or modify the number tools and modules.

The tool status monitoring system is implemented using a configurable system that enables customers (end users) to add processing tools, process modules, and/or sensors. The tool status monitoring system provides a development environment and methodology that enables customers to customize the monitoring software, to add analysis applications, and/or to install and monitor new tools, modules, and sensors in the environment.

The tool status monitoring system software architecture includes four functional components: a data acquisition component, a messaging system component, a relational database component, and a post-processing component. The architecture also includes in-memory data tables used for storing run-time data acquisition parameters. External to the tool status monitoring system is the tool, as well as a tool agent, which provides context information and start-stop timing commands used to synchronize data acquisition with the tool process.

The data acquisition component collects data points, called parameters and writes them to a file. The messaging system uses in-memory data tables for temporary storage of the run-time data received from the data acquisition component. The messaging system is notified of the start and end of the data acquisition period by an agent and/or tool client. At the end of the data acquisition period, the data is posted to the relational database and the in-memory data tables are cleared for the next acquisition period. Post processing of the data supplied by the messaging system is performed at run-time; post processing of the data stored in the relational database is performed off-line.

The goal of the tool status monitoring system is to use real-time and historical data to improve the semiconductor processing system's performance. To achieve this goal, potential problems, such as sensor problems, can be predicted and corrected before they occur, thus reducing equipment downtime and the number of non-product wafers that are produced. This can be accomplished by collecting data and then feeding that data into a software algorithm that models the behavior of a particular tool. The tool status monitoring system outputs process parametric adaptations that are then either fed forward or back to keep the tool performance within the specified limits. This control can be accomplished in different forms at different levels.

The alarm management portion of the tool status monitoring system can provide fault detection algorithms, fault classification algorithms, and/or fault forecasting algorithms. The tool status monitoring system can predict when a tool will malfunction, and can identify possible solutions to correct the malfunction and to reduce the number of non-product wafers that are produced during maintenance and processing functions.

The dynamic sensor applications give the user the ability to determine if a dynamic sensor is collecting data. When a data collection plan does not require data from a dynamic sensor, the sensor status state provides the user an indication that this sensor is not expected to be on. For example, when a data collection plan does not require data the sensor status should be "on-line off", and when the user has disabled the sensor at the system level the state should be "off-line off".

The interface to a dynamic sensor is tolerant to failures and service related disruptions. Additionally the interface provides setup and trouble shooting capability. For example, when a disruption occurs, the dynamic sensor and/or APC system detects the disruption and initiates logging, alarms and automatic recovery/analysis to determine the correct behavior and to minimize the loss of functionality. In this way, the risk to the customer of producing product while the dynamic sensor and/or APC system is operating at a decreased functionality can be reduced.

In addition, the dynamic sensor applications can operate during the service/maintenance mode. For the purpose of trouble shooting sensor communications, the dynamic sensor can be tested without running wafers. For example, a dynamic sensor can be set up, started and stopped from a WEB based GUI. This feature can be commonly used at sensor setup and routine sensor maintenance.

The APC system is implemented using a configurable system that enables customers (end users) to add tools, chambers, and sensors. The APC system provides a development environment and methodology that enables customers to customize the dynamic sensor applications to add analysis applications, and to install new dynamic sensors into the system.

The APC system provides fault detection algorithms, fault classification algorithms, and fault forecasting algorithms. The APC system can predict when a dynamic sensor will malfunction, can identify possible solutions, to correct the malfunction, and to reduce the opportunity for declaring false alarms that are not process related, but due to sensor failures or invalid sensor settings.

For example, fault forecasting can be a combination of fault detection and failure modeling. This method can be used to optimize the replacement of consumable parts, such as dynamic sensors, and it is intended to facilitate "opportunistic scheduling" of preventive maintenance tasks when there is a lull in production. Fault forecasting can be based either on a complex multivariate model or a simple univariate relationship.

Figure 2:
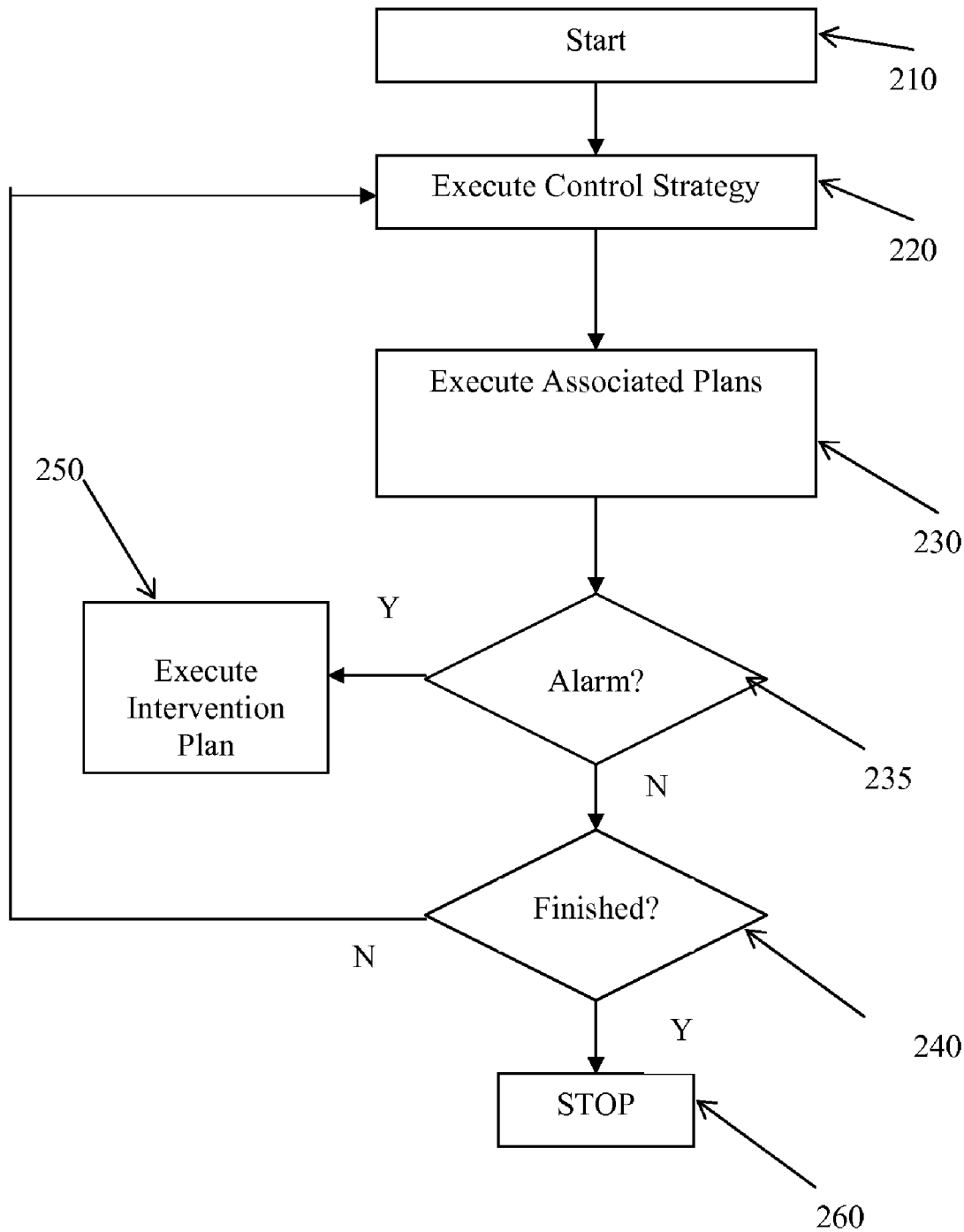
FIG. 2 shows a simplified view of a flow diagram for monitoring processing tools in a semiconductor processing system in accordance with one embodiment of the present invention.

FIG. 2 shows a simplified view of a flow diagram for monitoring processing tools in a semiconductor processing system in accordance with one embodiment of the present invention. The software and associated GUI screens provides a procedure for monitoring one or more processing tools in the system. The flow chart illustrates an exemplary Control Strategy procedure that is executed in the monitoring process. Procedure 200 starts at 210.

Procedure 200 can be performed for each production step being performed by a processing tool in the semiconductor processing system. A production step is an etching process, a deposition process, a diffusion process, a cleaning process, a measurement process, a transfer process, or other semiconductor manufacturing process. Strategies define what happens during a set of sequences on the processing tool. Strategies can define a set of sequences for a single wafer, a single tool, a single lot, or a combination of tool activities. A strategy can include a combination of processing activities, measurement activities, pre-conditioning activities, pre-measurement activities, and post-measurement activities. Each part (group of activities) in a strategy is called a plan.

Strategies are associated with a context. Context information can be used to associate a given operation with another operation. In particular, the context information is used to match a process step or recipe with one or more control strategies and the associated data collection plans.

In 220, a data collection (control) strategy is determined and executed based on a process context. The process context can be dependent upon the production step being performed and the tool being monitored. The context determines which strategy and/or plan is executed for a particular process recipe. For example, to associate a control strategy with a process type such as "Dryclean", the context for the strategy must contain the context term "Dryclean". In this case, the dynamic sensors can be configured to obtain "Dryclean" related data.

A data collection (control) strategy can be a holder of plans. A control strategy and the associated plans "control" which dynamic sensors are used, how the dynamic sensors are configured, which data is collected, and how the data is preprocessed.

In one embodiment, a process context can be compared with the control strategies. For example, APC server 160 (FIG. 1) gets the current process context as a string when a "process start" event occurs. The process context can be compared with the control strategies, and then a proper strategy can be identified.

In this process, search order can be important. For example, the search can be executed by using the precedence order in a GUI table. The search can be implemented using Structured Query Language (SQL) statements. Once a strategy is identified, a data collection plan, a data-preprocessing plan and a judgment plan are automatically determined, and a dynamic sensor plan is also determined. The data collection plan ID, data preprocessing plan ID, and judgment plan ID are sent to "execute control strategy" modules.

There can be multiple control strategies that match a run context, but only one control strategy is executed at a particular time for a particular processing module. The user determines the order of the strategies within a specific context by moving the strategies up or down on the list. When the time comes for the strategy to be selected, the software starts at the top of the list and goes down the list until it finds the first strategy that matches the requirements determined by the context.

One method for using context-based execution can be to do context matching. For example, when executing context matching, the context of the wafer currently being processed can be used. Alternately, the context of a substrate or other semiconductor product currently being processed can be used. When the context is determined, it can be compared with the context of control strategies. When a context match occurs, one or more control strategies can be executed.

Context can be defined by a combination of the context elements. For example, context can be an array of the context elements in a pre-determined order, or context may be a set of name-value pairs in a dictionary form.

Context elements used to select and execute a control strategy can include a tool Id, a recipe Id, a lot Id, and a material Id. In addition, the following elements can be used: cassette Id, process module Id, slot Id, recipe start time, recipe stop time, maintenance counter value, and/or product Id, which specifies the kind of product to be processed.

Figure 3:
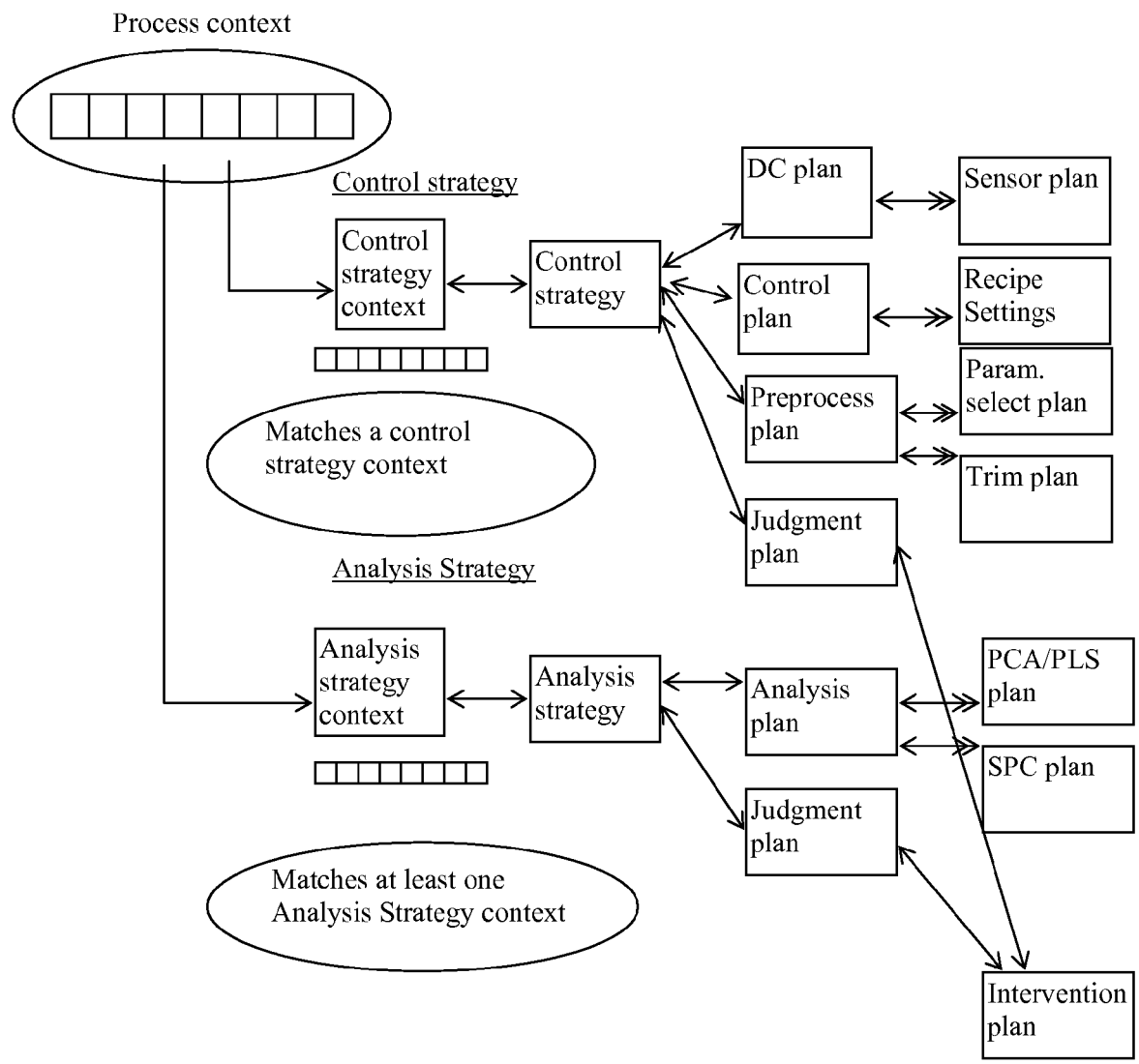
FIG. 3 shows an exemplary relationship diagram for strategies and plans in accordance with one embodiment of the present invention.

When a control strategy is executed, a data collection plan can be identified, a data pre-processing plan can be identified, and a judgment plan can be identified. An exemplary relationship diagram for strategies and plans is shown in FIG. 3. For example, a context-matching execution software module can be used that allows for the dynamic setup and invocation of a control strategy. In one case, a wafer-in event can trigger a system controller to look up the current context data, determine which strategy to run, and invoke the corresponding scripts to determine the associated plans.

In 230, the plans associated with the control strategy can be executed. At least one of a data collection plan, a data pre-processing plan, and a judgment plan can be executed. In addition, a dynamic sensor plan, a parameter save plan, recipe set point calculation plan, and/or a trim plan can also be executed.

Data collected during production runs that yield high quality product can be used to establish "good sensor state" data, and data collected subsequently can be compared with this baseline data to determine if a dynamic sensor is performing correctly in real-time.

For example, a data collection (control) strategy can be established to determine dynamic sensor status as part of the Quality Control (QC) testing. A QC control strategy and its associated plans can be executed to ensure that a dynamic sensor is operating properly or to ensure that dynamic sensors are setup to verify that a processing tool is operating properly. A QC control strategy and its associated plans can be executed at a prescribed time or when a user schedules one. When a QC control strategy and its associated plans are being executed, dynamic sensors can be setup so that diagnostic wafer data can be collected. For example, a diagnostic, dummy, product, or test wafer can be processed, and the context can be tool, module, or sensor diagnostics.

A QC data collection (control) strategy and its associated plans can be established for process module preparation processes, such as seasoning-related processes. For example, after a cleaning process (i.e., wet clean) a number of dummy wafers can be processed using seasoning related strategies, plans, and recipes that can include setting up a dynamic sensor. A user can use the strategies and plans that are part of the APC system, or a user can easily and quickly develop new seasoning-related control strategies using the APC system. A user may try a set of different seasoning data collection plans and dynamic sensors to determine which seasoning recipe has the best detection power. The data from these seasoning runs can be used to further refine process and tool modeling.

Dynamic sensors are set up when a data collection plan is executed. The data collection plan can comprise a sensor setup plan. For example, the start and stop times for the sensors can be determined by the sensor setup plan. The dynamic variables required by the dynamic sensors can be determined by the sensor setup plan. A recipe start event can be used to tell a sensor to start recording. A wafer-in event can be used to setup a sensor. A recipe stop event or a wafer-out event can be used to tell a sensor to stop recording. Different sensors can be used and different data can be collected for product wafers and non-product wafers.

The Data Collection Plan also includes a Data Preprocessing Plan that establishes how the expected observation parameters are to be processed with respect to spike counting, step trimming, value thresholds, and value clip limits.

When the data-preprocessing plan is executed, time series data can be created from raw data files and saved in the database; wafer summary data can be created from the time series data; and lot summary data can be created from the wafer data. The data collection can be executed while the wafer is being processed. When the wafer is out of this process step, then the data pre-processing plan can be executed.

A data collection plan can be a reusable entity configured by the user to collect the desired data. The sensor plan consists of the configuration of one or more sensors on one or more separate modules. The plan also includes the selection of the data items that should be collected by the associated sensors, and which of the data items are to be saved.

A dynamic sensor can be a device, instrument, chamber type, or other entity that either collects observation data or requires software setup interaction, or is handled by the system software as if it is a sensor. For example, processing tools and processing modules (chambers) can be treated as if they are sensors in data collection plans. Sensor status can be reported using a tool status screen, a chamber status screen, and/or a sensor status screen. Sensor state information can be provided to the user. For example, the sensor states can include: Off-line (disabled); and On-line (recording, idle, error, not selected). The user can be notified if the sensor goes from on-line to off-line.

Several instances of the same sensor type can be installed in a processing system at the same time. The user can select the specific sensor or sensors to use for each data collection plan.

The APC system reads the setup for the sensors from the database for the given data collection plan or uses parameters defined during setup. When the dynamic sensor configuration software fails to set up a sensor, the software assumes that the sensor is in the default off state for the run. This is the same action as if the DC plan called for the sensor to be off. The dynamic sensor configuration software sets an alarm for the process steps done with the dynamic sensor in the off state.

The APC system can comprise strategies and plans that have been designed to monitor several different types of tools and the associated dynamic sensors. For example, the APC system can interface with dynamic sensors that operate in different ways. For example, when the dynamic sensor sends the data in real-time, the APC system monitors the data in real-time, and when the sensor sends the data in non-real-time the APC system processes the data as soon as the sensor sends the data.

The APC system can comprise strategies, plans, and baseline models that can be used to setup dynamic sensors for generic fault detection and classification applications, chamber fingerprinting applications, seasoning completion applications, consumable life predictions, wet clean cycle applications, and the diagnostic applications for parts assembly.

The APC system provides independent data collection modes and setup modes for each process chamber; that is, each chamber can be independent of any other chambers, and the setup of one chamber does not interrupt the data collection of other chambers. In addition, the APC system provides independent data collection modes and setup modes for each sensor; that is, each sensor can be independent of any other sensors, and the setup of one sensor does not interrupt the data collection of other sensors.

When a control strategy comprises a judgment plan, the judgment plan is executed. The execution can be rule based and comprise SQL statements. A start-event judgment plan can be executed after a "start event" occurs, and an end-event judgment plan can be executed after an "end event" occurs. For example, when a start-event judgment plan is associated with a control strategy, it can be executed after a start event such as a wafer-in event, a process start event, or a recipe start event. A start-event judgment plan can be part of the alarm management portion of a tool status monitoring system.

When an alarm occurs, i.e., a fault is detected, a judgment plan can send messages and/or instructions to an intervention plan to take the following actions: display a fault message on a status screen, write a fault message in a log file, send a pause next wafer message, send a pause next lot message, send warning message to the tool, and email to the tool owner. For example, a judgment plan can send messages and/or instructions to an intervention plan to take the following sensor-related actions: stop using a sensor, reconfigure a sensor, re-calibrate a sensor, and replace a sensor.

Figure 4:
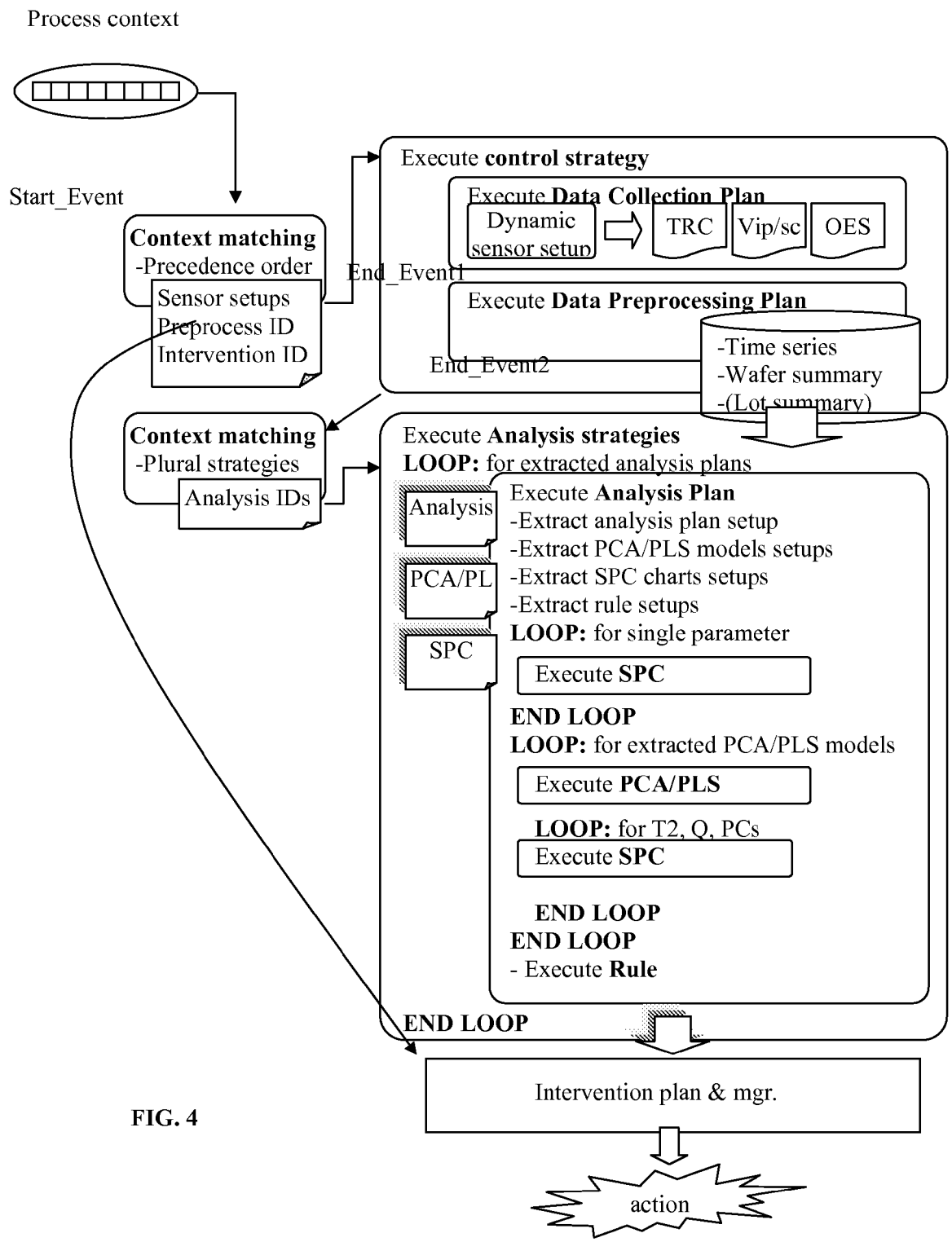
FIG. 4 shows an exemplary flow diagram for strategies and plans in accordance with one embodiment of the present invention.

Judgment plans operate independently. Each judgment plan does not know the actions in other judgment plans. So, as a result of whole analysis plans, there might be some redundancy or inconsistency in the messages sent by the various judgment plans. The intervention plan resolves any problems. An exemplary flow diagram for strategies and plans is shown in FIG. 4.

Returning to FIG. 2, in step 235, a query can be performed to determined if an alarm has been produced. When an alarm has occurred, procedure 200 branches to step 250. When an alarm has not occurred, procedure 200 branches to step 240. When procedure 200 has finished procedure 200 branches to step 260.

In step 250, the intervention plan can be executed. The intervention plan can execute the following processes: get messages (judgments) from each judgment plan; categorize actions from different judgment plans; attach process condition like tool id, recipe id, recipe start time, etc. for email and log; save log file/database; and/or send proper message to intervention manager. For example, the intervention plan can determine when a dynamic sensor has failed and/or has caused a fault.

Intervention strategies are defined as the action the user chooses to take as the result of data analysis. For example, these actions can include: flag a suspect wafer or lot and notify a system owner and/or tool owner; page or e-mail an engineer to review the data and make a decision; inhibit a sensor from collecting data; inhibit the tool from processing wafers until the data has been reviewed and the inhibit released; stop the tool or take the tool "off-line" which can purge the remaining wafers from the tool; and trigger chamber cleaning or maintenance procedures.

After the intervention plan is executed, messages on proper actions are sent to intervention manager. The followings are action candidates: display a sensor fault message on a status screen; send message to pause the process before the next wafer; send message to pause the process before the next lot; send pause or stop message to one or more tools; and/or send email to a tool owner or process owner. For example, a "stop" message can be used to tell a sensor to stop taking data; be used to tell the tool to continue processing the wafers already in the tool, and an "abort" message can be used to tell the tool not to process the wafers in the tool and to send them back to the carrier.

In some cases, the tool status monitoring system will be able to intervene and respond to a problem without human intervention. In other cases, human intervention will be required. For example, a user can access the data from the tool status monitoring system to determine the nature of the fault. The user can intervene, and the user can decide to continue with the lot or terminate it. If the user terminates the process, then a tool may placed in a repair state. The user can trigger this from the tool screen. For example, a dynamic sensor can be replaced. After sensor replacement, check, and process test, the process can resume with the next wafer.

During the execution of the intervention plan and analysis plan, the APC system can present "sensor-related" charts to the user. For example, the charts can include manometer data, mass flow data, leakage data, pump data, gas system data, and transfer system data. The Charts can display real-time data, historical data, and the combination of real-time and historical data for one or more tools.

Analysis strategies can also be performed by the APC system after the Control Strategies are executed. Analysis type strategies such as a Fault Detection and Classification (FDC) strategy define what happens during a set of sequences on the processing tool. An FDC strategy can "analyze" data after collection using a set of analysis plans; the FDC strategy can "determine" a course of action using a set of judgment plans. For example, SPC charts and multivariate analysis can be used. FDC strategies can define a set of data analysis plans for a single wafer, a single tool, a single lot, or a combination of tool activities. Each part in a strategy can be called a plan.

Strategies are associated with a context. Context information can be used to associate a given operation with another operation. In particular, the context information associates a process step or recipe with one or more strategies and/or plans. In general, an analysis strategy can be triggered by an end event and determines a set of post processing activities. For example, an end event can be a wafer-out event, a lot completion event, or other process completion event.

When an analysis strategy is executed, one or more of the following plans can be executed: Principal Component Analysis (PCA) plan, Partial Least Squares (PLS) plan, Statistical Process Control (SPC) plan, Multivariate Analysis (MVA) plan, and User Defined plan. Analysis plans comprise means for the detection and classification of sensor problems, when a tool is not in production; detection of sensor problems during production; detection and classification of sensor problems during production; the prediction of sensor problems during production; and the prediction of sensor problems after production.

Figure 5:
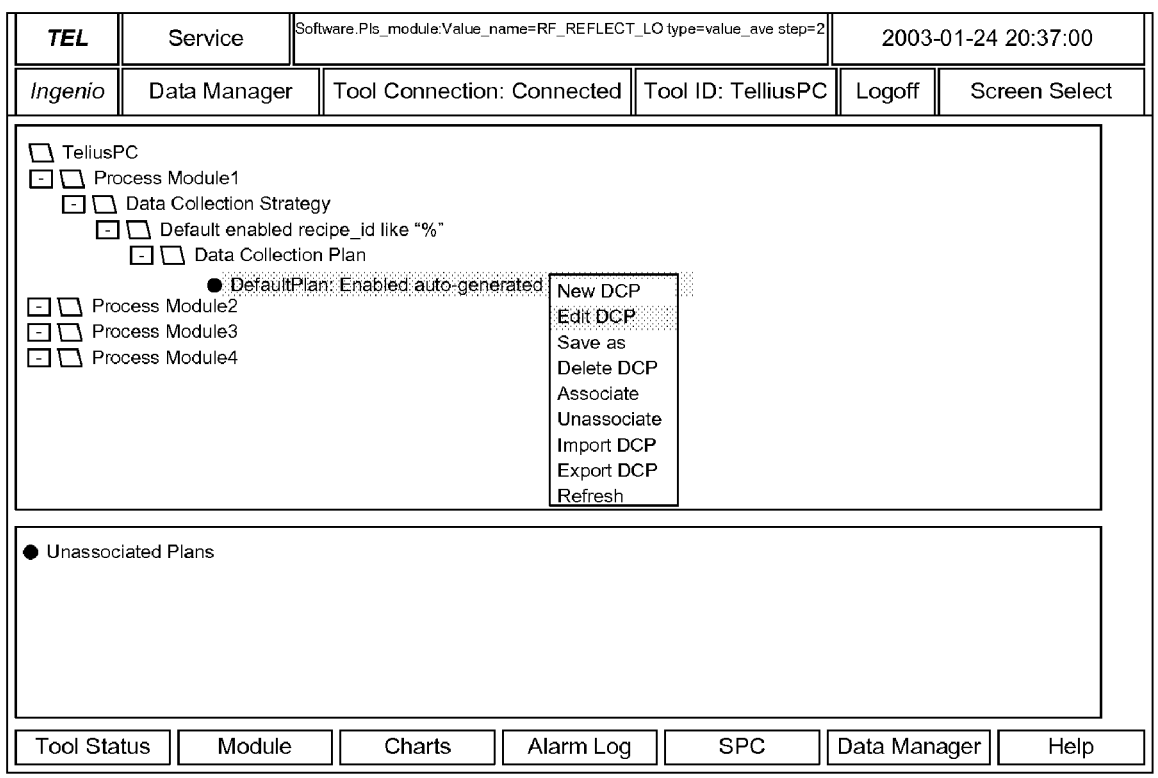
FIG. 5 shows an exemplary view of a Selection screen in accordance with one embodiment of the present invention.

FIG. 5 shows an exemplary view of a Selection screen in accordance with one embodiment of the present invention. In the illustrated embodiment, a navigation tree is shown having five sublevels. This is not required for the invention; any number of sublevels can be used. Alternately, other selection means can be used such as selection tabs or buttons. For example, selection tabs can comprise left-to-right tabs, right-to-left tabs, top-to-bottom tabs, and bottom-to-top tabs. In alternate embodiments, navigation trees can be displayed in different languages and can be ordered and positioned differently.

The first level shown is the tool level, but this is not required for the invention. Alternately, a system level or other higher level group can be shown. For example, a tool level can be associated with an etching tool, a deposition tool, a cleaning tool, a transfer tool, or other semiconductor processing tool.

The next level shown is a process module level. A user can open a tool level folder to display the status for a process module level. For example, FIG. 5 shows an opened tool level folder labeled as "TeliusPC" and four process module folders labeled as "Process Module 1" through "Process Module 4". A user can open a process module folder to display the status for the strategies associated with a particular process module.

The next level shown is a strategy level. A user can open a process module level folder to display the status for a strategy level. For example, FIG. 5 shows opened folders labeled as "Data Collection Strategy" and "Analysis Strategy". A user can open a strategy folder to display the status for the context and plans associated with a particular strategy.

A Data Collection (Control) Strategy folder can be opened to display a list of data collection strategies. In the illustrated embodiment, a single control strategy can be shown along with the context and plans associated with a control strategy. Context can be used to invoke the specific data collection plans that are required for a particular item, such as a dummy or diagnostic wafer.

A particular data collection plan folder can be opened to display one or more data collection plan names. In FIG. 5, a single data collection plan name "DefaultPlan1" is displayed.

A data collection strategy has an associated data collection plan that describes how the sensors should be configured, and which observation parameters should be collected. A data collection strategy can also be associated with a preprocessing plan. A preprocessing plan describes how the expected observation parameters are to be processed with respect to spike counting, step trimming, high clip and low clip limits.

From a data collection plan level, a user can access a sensor configuration level. At a sensor configuration level, a user can install, change, and uninstall a dynamic sensor. In addition, a user can create, edit, and review the setup information for a dynamic sensor.

As shown in FIG. 5, a Selection screen can comprise Title Panel, Information Panel and Control Panel. For example, a Title Panel can comprise the top two rows of a screen. A Title Panel can comprise: company logo field to display version information; User ID field to display the ID of the current user; Alarm Message field to display a message when there is an active alarm; Current Date and Time field to display the current date and time of the server; Current Screen Name field to display the name of the current screen (e.g., Tool Status); Communication Status field to display current status for communications link between server and tool; Tool ID field to display the ID of the tool being monitored; Logoff field allows a user to log off; Screen Select field can be selected to view a list of all available screens. In alternate embodiments, a Title Panel can be displayed in different languages and can be sized and positioned differently.

Control Panel can comprise buttons along the bottom of the screen. These buttons enable the user to display the primary screens. The primary screen buttons are Tool Status, Module, Charts, Alarm Logs, SPC, Data Manager, and Help.

For example, a Tool Status button can be used to view data for a specific tool. A Module button can be used to view data for a specific process module. A Charts button can be used to setup and view summary and trace charts. An Alarm Logs button can be used to view a list of current alarms. A SPC button can be used to view process parameters on an SPC chart. A Data Manager button can be used to configure data collection plans, and a Help button can be used to display online help documentation. These buttons can be conveniently displayed along the bottom of many screens. These buttons provide a fast and convenient means for allowing a user to display a primary screen. In alternate embodiments, these buttons can be displayed in different languages and can be sized and positioned differently.

Figure 6:
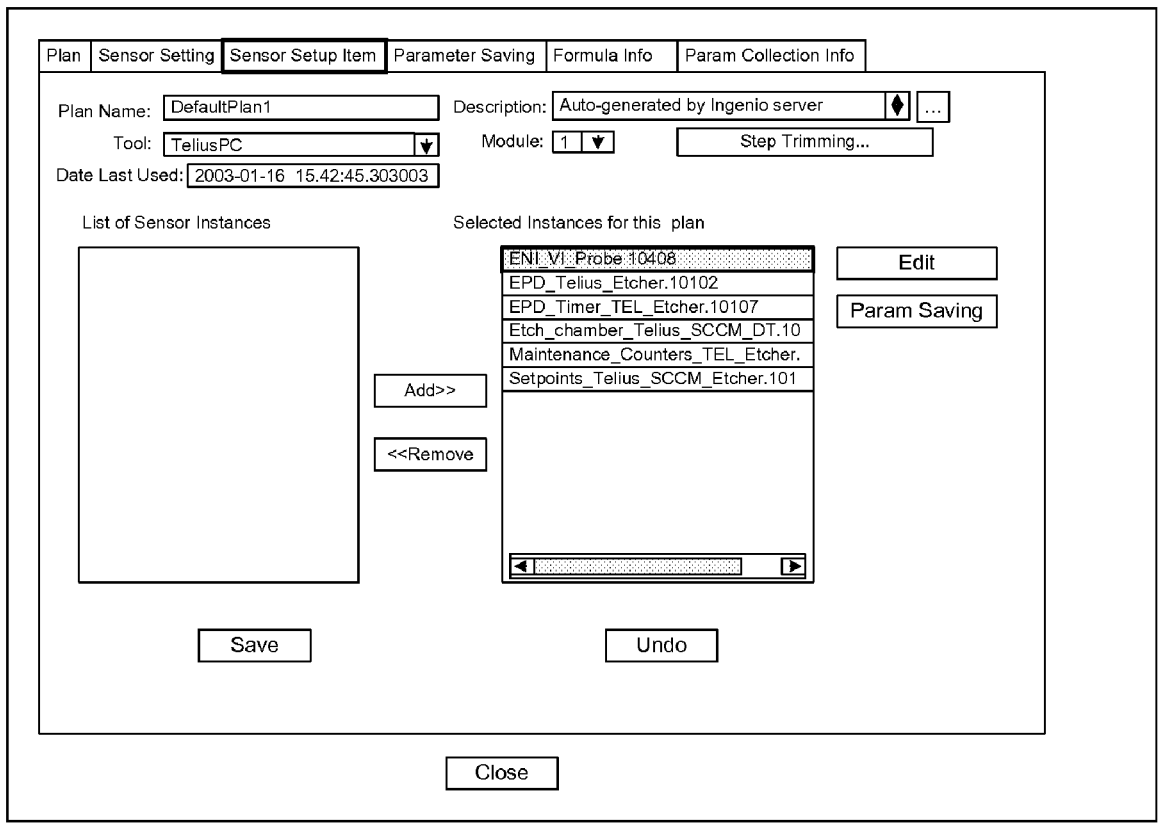
FIG. 6 shows an exemplary view of a Data Collection Plan Information screen in accordance with one embodiment of the present invention.

FIG. 6 shows an exemplary view of a Plan Information screen in accordance with one embodiment of the present invention that can be accessed from the data collection plan level of FIG. 5. In the illustrated embodiment, an information panel is shown with selection tabs. The selection tabs can be used to select other GUI screens. Alternately, a navigation tree can be used to display and select other GUI screens.

The list of sensor instances can comprise a list of sensor instances that match the criteria for tool_id, module_id and plan name. A list can be provided because one sensor type can have many sensor instances. As an example, a plan named "DefaultPlan1" is shown with information in a number of fields, but this is not required for the invention. Alternately, other plans and other dynamic sensors can be shown. For example, Langmuir probes, OES probes, and other types of semiconductor processing probes can be used.

The Plan Name field includes a name for a data collection plan, and the description field can include a detailed description for this data collection plan. The Tool id field can include a list of existing tools (tool id) for selection, and the Module id field can include a list of existing process modules (module id) for selection. A Date Last used date field can be used to indicate the last date of usage for this data collection plan.

The Save button can be used to save the data from this screen to the database. The Undo button can be used to fill-in original (default) data for all fields. The Add button can be used to add a selected dynamic sensor instance from the right side list to the left side table. The Remove button can be used to remove a selected sensor type from the left side table to the right side. A pop-up message window will display a confirmation, and an entry will be added back to the right side table.

The Edit button can be used to edit the selected sensor parameter by enabling a Sensor Setting screen as shown in FIG. 7. The Param Saving button can be used to enable the Parameter Saving screen as shown in FIG. 10.

The Save button can be used to update/insert data into two tables: a dc_plans table and a sensor_dcplan table.

FIG. 7 shows an exemplary view of a Sensor Setting screen in accordance with one embodiment of the present invention. In the illustrated embodiment, an information panel is shown with selection tabs. The selection tabs can be used to select other GUI screens. Alternately, a navigation tree can be used to display and select other GUI screens. A user can use a sensor configuration screen, such as the Sensor Setting screen, to review and edit a parameter associated with a dynamic sensor. As an example, two parameters are shown, but this is not required for the invention. A dynamic sensor can have any number of parameters associated with it.

Figure 8:
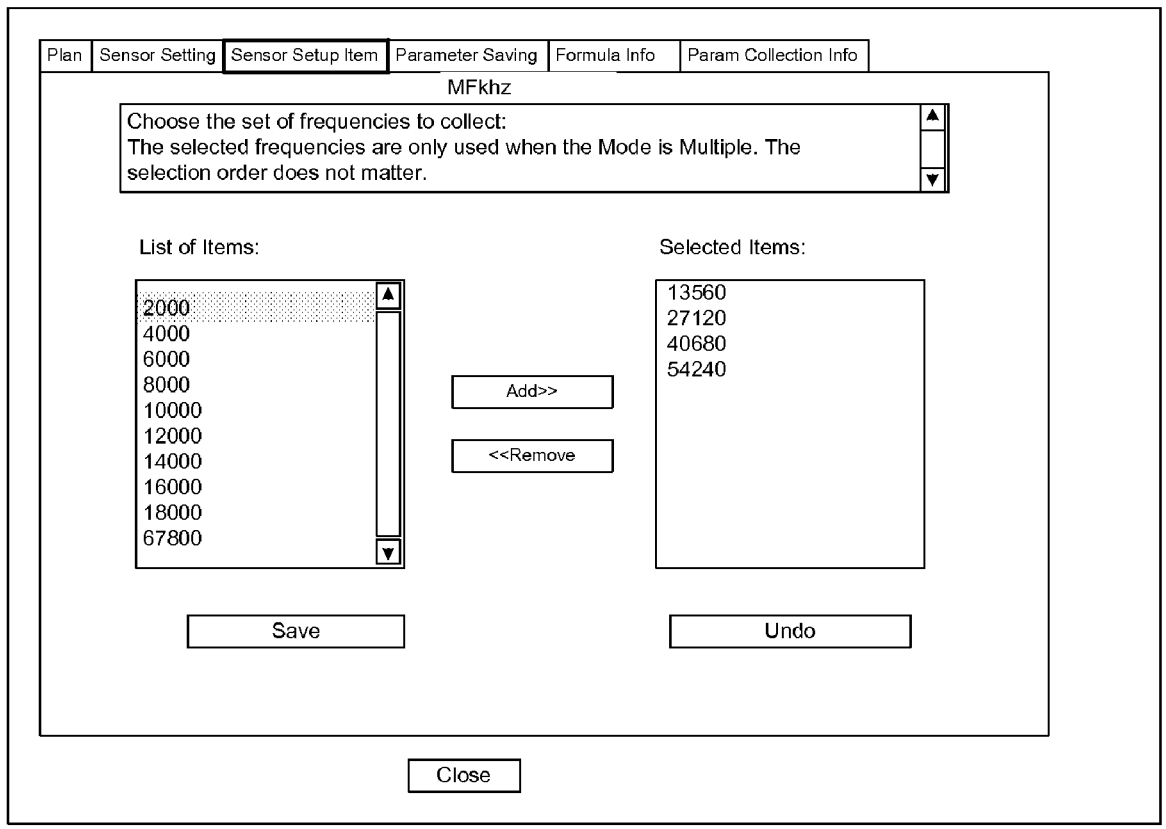
FIG. 8 shows an exemplary view of a sub screen of a data collection plan that is defining the sensor setup for an RF Harmonic based sensor in accordance with one embodiment of the present invention.

A list of setup items for the selected sensor can be shown on the screen. The edit button can be used to display a Sensor Setup Item screen as shown in FIG. 8. This screen allows the user to modify selected parameter dependent on a selected value_type.

The Sensor Setting screen includes an Item Name field, an Item Value field, a Description field, and an IS_Optional field that can be used to control access to the data. For example, a user can select a parameter for this data collection if the value of the IS_Optional variable is true.

FIG. 8 shows an exemplary view of a Sensor Setup Item of a Data Collection Plan screen in accordance with one embodiment of the present invention. In the illustrated embodiment, an information panel is shown with selection tabs. The selection tabs can be used to select other GUI screens. Alternately, a navigation tree can be used to display and select other GUI screens. A user can use a sensor configuration screen, such as a Sensor Setup Item screen, to configure a parameter for a dynamic sensor. As an example, information for "operating frequencies" for a parameter is shown, but this is not required for the invention. A dynamic sensor can have any number of parameters associated with it.

The screen can comprise a name field that can be displayed as a title, a description/instruction/help field for providing instructions and/or help messages to the user. The Sensor Setup Item screen can also comprise a List of Items field and a Selected Items field. Both of these are shown as lists.

The Save button can be used to save the data from this screen to the database. The Undo button can be used to fill-in original (default) data for all fields. The Add button can be used to add a selected sensor instance from the right side list to the left side table. The Remove button can be used to remove the selected sensor type from the left side list to the right side list. A pop-up message window will display a confirmation, and an entry will be added back to the right side list.

The Sensor Setup Item screen provides an easy-to-use means for configuring a dynamic sensor and/or changing the parameters associated with a dynamic sensor. The illustrated example shows that a user can be provided with an instructional message for a mode of operation for a particular dynamic sensor. The instructional messages provide a sense of security to the user, and prevent errors. A list of items can be provided to the user and buttons are provided that allow the user to move items to and from the Selected Items list. This Sensor Setup Item (editing) screen for selected parameter is dependent on the value_type of the selected parameter, and for the exemplary screen the value_type can be selection.

When installing a new sensor or changing an existing sensor on a module, the APC system and the dynamic sensor applications can have one module off-line. For example, sensor cables (RS232, Ethernet, fiber, etc.) associated with any one sensor can be disconnected and reconnected; the networking address of a sensor can be changed; sensor setup settings can be configured; and a sensor can be test including manually setting up the sensor, (i.e., manually starting the sensor, monitoring the sensor data in real-time, stopping the sensor, saving sensor data collected as a file, and saving sensor settings as a file) without disrupting the running of other modules.

Figure 9:
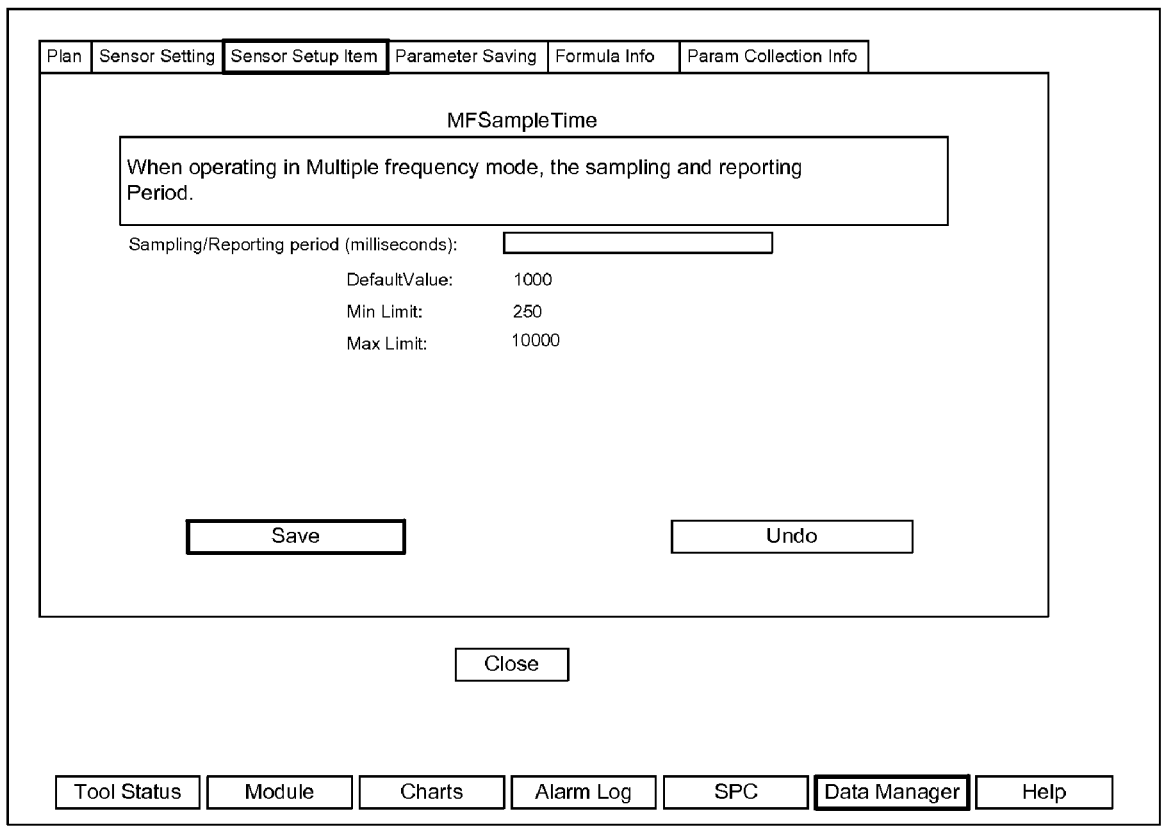
FIG. 9 shows an exemplary view of another Exposure time sub screen of a Sensor Setup Item screen in accordance with one embodiment of the present invention.

FIG. 9 shows an exemplary view of another Sensor Setup Item screen in accordance with one embodiment of the present invention. In the illustrated embodiment, an information panel is shown with selection tabs. The selection tabs can be used to select other GUI screens. Alternately, a navigation tree can be used to display and select other GUI screens. A user can use a sensor configuration screen, such as a Sensor Setup Item screen, to configure a parameter for a dynamic sensor.

The screen can comprise a name field that can be displayed as a title, and a description/instruction/help field for providing instructions and/or help messages to the user. The Sensor Setup Item screen can also comprise a number of fields for providing a value. The figure shows a Default Value field, an insert Value field, a Min Limit field, and a Max Limit field and a Selected Items field. Both of these are shown as lists. The Save button can be used to save the data from this screen to the database. The Undo button can be used to fill-in original (default) data for all fields.

The Sensor Setup Item screen provides means for configuring a dynamic sensor and/or changing the parameters associated with a dynamic sensor. The illustrated example shows that a user can be instructed to insert a value for "MFSampleTime", and the other fields provide information that makes the choice less prone to error. The additional fields provide a sense of security to the user, and prevent errors. This Sensor Setup Item (editing) screen for selected parameter can be dependent on the value_type of the selected parameter, and for this screen, the value_type can be integer.

FIG. 10 shows an exemplary view of Parameter Saving screen in accordance with one embodiment of the present invention. In the illustrated embodiment, an information panel is shown with selection tabs. The selection tabs can be used to select other GUI screens. Alternately, a navigation tree can be used to display and select other GUI screens. A user can use a sensor configuration screen, such as a Parameter saving screen, to determine the dynamic sensor parameters to be saved to a database.

The Parameter Saving screen shows a list of parameters for a Selected Sensor Instance in a Selected Data Collection Plan. The database save plan can provide a link to each parameter in the parameter saving screen.

The Parameter Saving screen can comprise a list of items for the selected sensor including the selected sensor setup item's name. The Parameter Saving screen can also comprise an Edit Button that enables the panel; an Add Button can be used to add a new parameter name with specific formula; and a Summary Info button. The Summary Info button can be use to select a parameter for saving and enable the screen shown in FIG. 11. Undo Button can be used to fill all fields with original values, and the Save Button can be used to save the selection of check boxes in the run_value table. The listed items include the Param Name, a New Param Name, a Formula, and a Save select check box.

Figure 11:
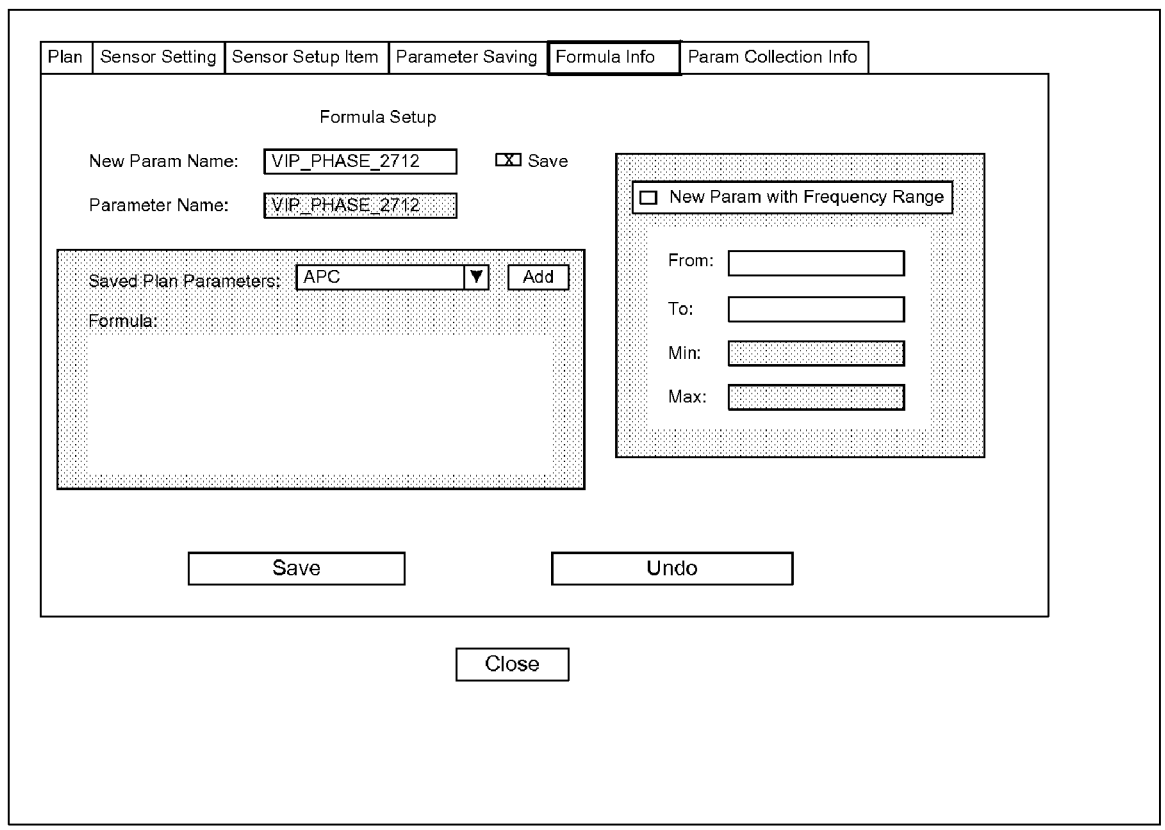
FIG. 11 shows an exemplary view of a Formula Info screen in accordance with one embodiment of the present invention.

FIG. 11 shows an exemplary view of a Formula Info screen in accordance with one embodiment of the present invention. In the illustrated embodiment, an information panel is shown with selection tabs. The Formula Info screen provides a formula editor for a selected parameter associated with a dynamic sensor.

For example, a user can assign a new parameter name to an existing parameter in the New Param Name field. The Parameter Name field displays the original name of parameter. A Saved Plan Parameter field can comprise a list of parameters in the selected data collection plan. An Add Button can be used to add selected saved plan parameters from drop down box into the Formula Description field. The Save button can be used to save information to a run_value table. The software does formula checking and determines if the assigned parameter name is unique or not. The Undo button can be used to undo the changes. The Save check box can be used to select the parameter for data collection plan and also enables a screen as shown in FIG. 12.

Figure 12:
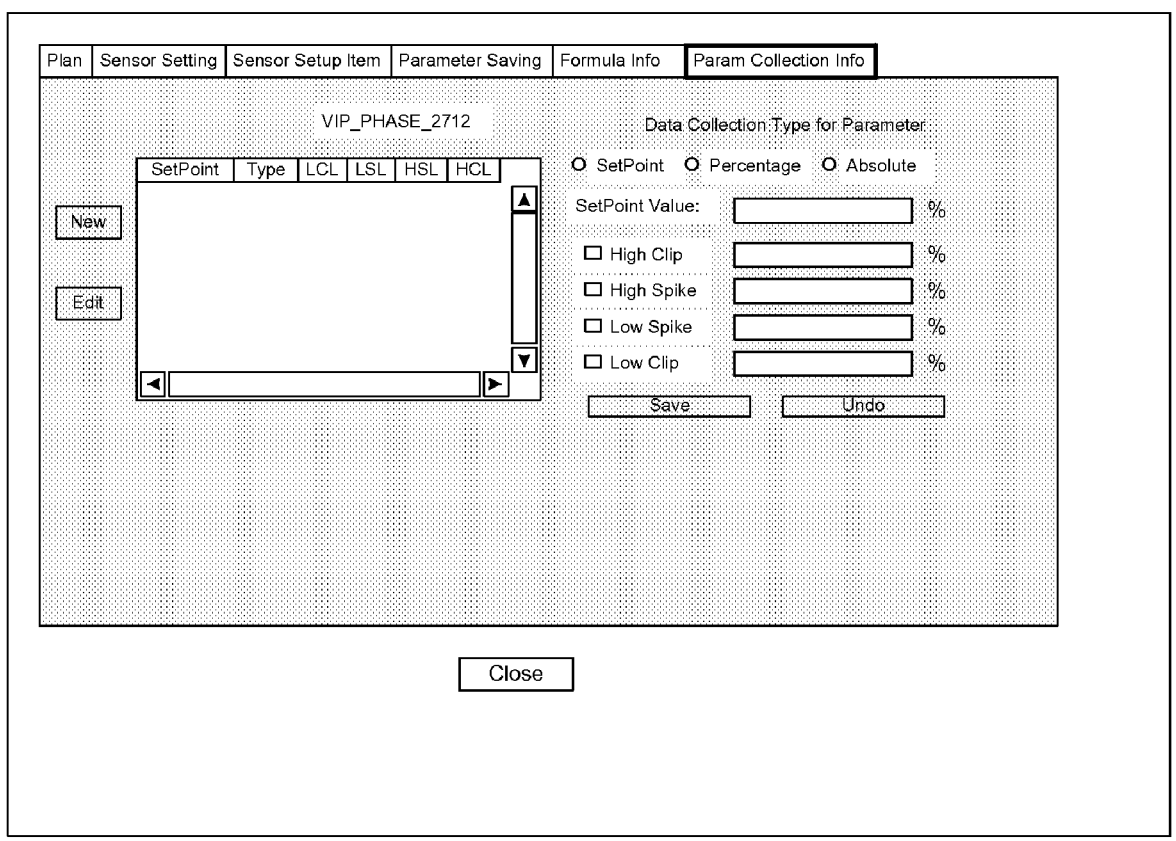
FIG. 12 shows an exemplary view of a Parameter Collection Info screen used for defining dynamic filtering using recipe setpoints in accordance with one embodiment of the present invention.

FIG. 12 shows an exemplary view of a Parameter Collection Info screen in accordance with one embodiment of the present invention. In the illustrated embodiment, an information panel is shown with selection tabs. The Parameter Collection Info screen provides a means for editing the summary data collection Information for a selected parameter associated with a dynamic sensor.

For example, a Parameter Collection Info screen can comprise a name field that displays the selected parameter name. The New Button enables the right side fields for input; the Edit Button can be used to fill in values in the right side fields. The SetPoint, Percentage, and Absolute check boxes are used to select one of these data collection types for the parameter in the data collection plan. The Threshold, Low Spike, High Spike, and Clip check boxes are use to select one or more of these data pre-processing items and to enable corresponding text field. The Save Button can be used to save information from right side fields in the param_limits table. The Undo Button can be used to undo the changes.

Sensor Type can be a generic term that corresponds to the function of the sensor. A sensor instance pairs the sensor type to a specific sensor on a process module (chamber) and tool. At least one sensor instance is configured for each physical sensor that is attached to a tool.

A sensor type can include all of the variables that are needed to set up a particular type of sensor at run-time. These variables can be static (i.e., all sensors of this type have the same value, configurable by instance (i.e., each instance of the sensor type can have a unique value), or configurable by the data collection plan (i.e., each time the sensor is activated at run time, it can be given a different value). For example, a "configurable by instance" variable can be the probe IP address. This address varies by instance (for each process chamber) but does not vary from run to run. A "configurable by data collection plan" variable can be the list of harmonic frequencies for the probe. This sensor can be dynamic, and a process based on the context information can configure the variables. For example, process context information can include tool ID, module ID, slot ID, recipe ID, cassette ID, start time and end time.

The applications associated with the dynamic sensors are flexible and configurable. For example, customer dependent information like IP address, tool id, etc. can be system variables, and after a customer or field engineer configures the setup, the information is usable at the next start up. The dynamic sensor applications can operate under several different operating systems such as Windows NT and Windows 2000.

Function buttons may be located along the bottom and/or top of the GUI screens. Because the same function buttons are displayed on many of the screens, users can navigate to any function from any screen without having to traverse a series of menus. A LogOff button can be displayed in the Title Panel, and it is used to log off of the system. Reminder messages can be provided when data has been modified and not saved. In addition, a Help button can be displayed, and it can be used to view content specific and general documentation to aid the user understand the data being presented to the user and/or the data being requested from the user.

Numerous modifications and variations of the present invention are possible in light of the above teachings. It is therefore to be understood that, within the scoop of the appended claims, the invention may be practiced otherwise than as specifically described herein.

What is claimed is:

1. A method for setting-up a dynamic sensor in a semiconductor processing environment using Graphical User Interfaces (GUIs), the method comprising:
   executing a data collection plan wherein the dynamic sensor includes an ODP sensor, an OES sensor, a VIP sensor, or any combination thereof;
   using the data collection plan to determine a dynamic sensor setup plan, wherein a start time, a stop time spike counting, step trimming, value thresholds, and value clip limits are determined by the dynamic sensor setup plan;
   executing the dynamic sensor setup plan to set up the dynamic sensor, wherein the dynamic sensor setup plan includes an IP address for the dynamic sensor.

2. The method as claimed in claim 1, further comprising:
   using a plan list GUI screen to determine the data collection plan; and
   using a plan GUI screen to determine a selected dynamic sensor instance for the dynamic sensor plan.

3. The method as claimed in claim 2, further comprising:
   selecting a dynamic sensor instance from a list of sensor instances on the plan GUI screen; and
   adding the selected dynamic sensor instance to the selected instances for this plan list.

4. The method as claimed in claim 2, further comprising:
   selecting a dynamic sensor instance from a selected instances for this plan list on the plan GUI screen; and
   moving the selected dynamic sensor instance from the selected instances for this plan list to the list of sensors Instances list.

5. The method as claimed in claim 1, further comprising:
   selecting the data collection plan using a multi-level navigation tree on a selection GUI screen.

6. The method as claimed in claim 5, wherein the multi-level navigation tree comprises a tool level, a module level, a strategy level, a context level, and a data collection plan level.

7. The method as claimed in claim 6, wherein the strategy level comprises a control strategy level and an analysis strategy level.

8. The method as claimed in claim 5, wherein the selection GUI screen comprises a title panel, an information panel, and a control panel.

9. The method as claimed in claim 8, wherein the title panel comprises company logo block to display version information, a user ID block to display the user ID of a current user, an alarm message block to display an alarm message when there is an active alarm, a current date and time block to display the current date and time of a server, a current screen name block to display a name of a current screen, a communication status block to display a current status for communications link between server and tool, a tool ID block to display the ID of the tool being monitored, a logoff block to allow a user to log off, and a select screen block to view a list of all available screens.

10. The method as claimed in claim 8, wherein the control panel comprises a tool status button, a module button, a charts button, an alarms button, a SPC button, a control setup button, and a help button.

11. The method as claimed in claim 1, wherein the GUI comprises at least one screen containing selection tabs from a group consisting of left-to-right tabs, right-to-left tabs, top-to-bottom tabs, and bottom-to-top tabs.

12. The method as claimed in claim 2, further comprising: selecting the data collection plan using a selection tab on the plan list GUI screen.

13. The method as claimed in claim 2, further comprising using a sensor setting GUI screen to determine at least one setup parameter for the selected dynamic sensor instance.

14. The method as claimed in claim 13, further comprising:
selecting a dynamic sensor instance on the plan GUI screen;
actuating a portion of the plan GUI screen to activate a sensor setting GUI screen; and
verifying setup items for the selected dynamic sensor instance.

15. The method as claimed in claim 13, further comprising:
selecting a dynamic sensor instance on the plan GUI screen;
actuating a portion of the plan GUI screen to activate a parameter saving screen; and
verifying that a parameter is being saved.

16. The method as claimed in claim 14, further comprising:
selecting a dynamic parameter on the sensor setting GUI screen;
actuating a portion of the sensor setting GUI screen to activate a sensor setup item GUI screen; and
verifying selected items for the selected dynamic parameter.

17. The method as claimed in claim 16, further comprising:
selecting an item from a list of items on the sensor setup item GUI screen; and
adding a selected item to the selected items list for the selected dynamic sensor.

18. The method as claimed in claim 16, further comprising:
selecting an item from a list of selected items for the selected dynamic sensor on the sensor setup item GUI screen; and
removing a selected item from the selected items list for the selected dynamic sensor.

19. The method as claimed in claim 16, further comprising:
selecting a value field from a plurality of value fields for a dynamic parameter on the sensor setup item GUI screen;
modifying the selected value field; and
saving the modified dynamic parameter.

20. The method as claimed in claim 2, further comprising:
activating a parameter saving screen; and
verifying that correct dynamic parameters are being saved.

21. The method as claimed in claim 2, further comprising:
activating a parameter collection Info screen; and
verifying that a data collection type is correct for a dynamic parameter being saved.

22. The method as claimed in claim 2, further comprising:
activating a formula info screen;
entering a new parameter name; and
creating a new dynamic parameter using a formula that includes at least one value for a setup parameter for selected sensor instance.

23. The method as claimed in claim 1, further comprising executing a control strategy to determine the data collection plan.

24. The method as claimed in claim 23, further comprising determining the control strategy using process context, the process context being dependent upon at least one of a process being performed, a dynamic sensor instance, a processing module being monitored, and a tool being monitored.

* * * * *